US012374512B2

(12) United States Patent
Yen et al.

(10) Patent No.: US 12,374,512 B2
(45) Date of Patent: Jul. 29, 2025

(54) KEYSWITCH STRUCTURE AND KEYCAP SUPPORTING MECHANISM THEREOF

(71) Applicant: DARFON ELECTRONICS CORP., Taoyuan (TW)

(72) Inventors: Chih-Chung Yen, Taoyuan (TW); Jan-Don Jane, Taoyuan (TW); Hsiao-Han Chu, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 223 days.

(21) Appl. No.: 18/210,660

(22) Filed: Jun. 16, 2023

(65) Prior Publication Data

US 2024/0363293 A1 Oct. 31, 2024

(30) Foreign Application Priority Data

Apr. 27, 2023 (TW) ................................ 112115750

(51) Int. Cl.
*H01H 13/10* (2006.01)

(52) U.S. Cl.
CPC .................................. *H01H 13/10* (2013.01)

(58) Field of Classification Search
CPC .... H01H 13/10; H01H 3/122; H01H 13/7065; H01H 2221/058; H01H 3/125
USPC ................................ 200/341, 344, 345, 520
See application file for complete search history.

(56) References Cited

U.S. PATENT DOCUMENTS

| | | | | |
|---|---|---|---|---|
| 10,325,735 | B2 | 6/2019 | Yen | |
| 10,796,861 | B2 | 10/2020 | Chen | |
| 11,830,685 | B2 * | 11/2023 | Ku | H01H 13/14 |
| 11,869,730 | B2 * | 1/2024 | Ning | H01H 3/125 |
| 2012/0298495 | A1 | 11/2012 | Zhang | |
| 2022/0189715 | A1 | 6/2022 | Hsu | |

FOREIGN PATENT DOCUMENTS

| | | |
|---|---|---|
| TW | M419975 U1 | 1/2012 |
| TW | M542226 U | 5/2017 |

* cited by examiner

*Primary Examiner* — Lheiren Mae A Caroc
(74) *Attorney, Agent, or Firm* — Winston Hsu

(57) ABSTRACT

A keyswitch structure includes a base plate, a keycap, and a keycap support mechanism. The keycap support mechanism is connected to and between the base plate and the keycap. The keycap is movable relative to the base plate through the keycap support mechanism. The keycap support mechanism includes an inner support and an outer support. The outer support and the inner support are pivotally connected with each other around a rotation axis. The outer support includes two outer frame portions and a central frame. The central frame is located between the two outer frame portions in a direction parallel to the rotation axis. Therein, in the case where the inner support is stacked on the outer support, the inner support is located inside the outer support and straddles the central frame.

20 Claims, 11 Drawing Sheets

KEYSWITCH STRUCTURE AND KEYCAP SUPPORTING MECHANISM THEREOF

BACKGROUND OF THE INVENTION

1. Field of the Invention

The present invention relates to a keyswitch structure, and more particularly to a keycap support mechanism of a keyswitch structure.

2. Description of the Prior Art

The main structure of the current mechanical keyswitch structure is that a lift mechanism is connected between the keycap and the base plate, so that the keycap can move up and down relative to the base plate. The movement steadiness of the keycap, including the movement stroke and smoothness, usually depends on the lift mechanism. When the movement steadiness of the lift mechanism itself is poor, it is difficult for the keycap to move steadily. For multi-size keys, such as space bar, Enter, Shift, CapsLock, Ctrl, etc., a plurality of lift mechanisms are generally used to jointly support the keycap. In this structural configuration, each lift mechanism operates independently. When the keycap is pressed, the keycap is not easy to move up and down horizontally and is easy to be skewed, resulting in poor triggering of the switch of the keyswitch structure. If the keycap is supported by a single support mechanism, the support mechanism needs to be stretched horizontally. The outer support of a scissors support mechanism generally is only a simple frame structure. After the frame structure is elongated, the structural rigidity is greatly reduced, resulting in that it is difficult for the keycap to move up and down horizontally, and the keycap is easy to swing left and right in the horizontal direction. In addition, when the keyswitch structure adopts a low profile design, its components will be thinned in structure, resulting in insufficient rigidity of the components themselves, and the above problems will be more serious.

SUMMARY OF THE INVENTION

An objective of the invention is to provide a keycap support mechanism, of which an outer support as a whole shows a frame structure with a connecting structure in the middle to increase the rigidity of the overall structure of the outer support. The structural design of the outer support also avoids structural interference with an inner bracket of the keycap support mechanism, so that the inner bracket can be connected to the inner side of the outer bracket. Thereby, the overall structural rigidity of the keycap support mechanism can be improved.

A keycap support mechanism according to the invention includes an inner support and an outer support. The outer support and the inner support are pivotally connected with each other around a rotation axis. The outer support includes two outer frame portions and a central frame. The central frame is located between the two outer frame portions along the rotation axis. Therein, when the inner support is stacked on the outer support, the inner support is located inside the outer support and straddles the central frame. Therefore, the central frame can increase the overall rigidity of the outer support, and the inner support can maintain structural continuity in the direction parallel to the rotation axis, so that the overall structural rigidity of the keycap support mechanism increases, which is conducive to enhancing the movement stability of the keycap support mechanism and also to transfer force horizontally.

Another objective of the invention is to provide a keyswitch structure with the above keycap support mechanism, so that the overall structural rigidity of the keyswitch structure is also improved, which helps the keycap to move up and down steadily when pressed.

A keyswitch structure according to the invention includes a base plate, a keycap, and a keycap support mechanism. The keycap support mechanism is connected to and between the base plate and the keycap. The keycap can move up and down relative to the base plate through the keycap support mechanism. The keycap support mechanism includes an inner support and an outer support. The outer support and the inner support are pivotally connected with each other around a rotation axis. The outer support includes two outer frame portions and a central frame. The central frame is located between the two outer frame portions along the rotation axis. Therein, when the inner support is stacked on the outer support, the inner support is located inside the outer support and straddles the central frame. Therefore, the central frame can increase the overall rigidity of the outer support, and the inner support can maintain structural continuity in the direction parallel to the rotation axis, so that the overall structural rigidity of the keycap support mechanism increases, which is conducive to enhancing the movement stability of the keycap support mechanism and also to transferring force horizontally, which helps the keycap to move up and down steadily when pressed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
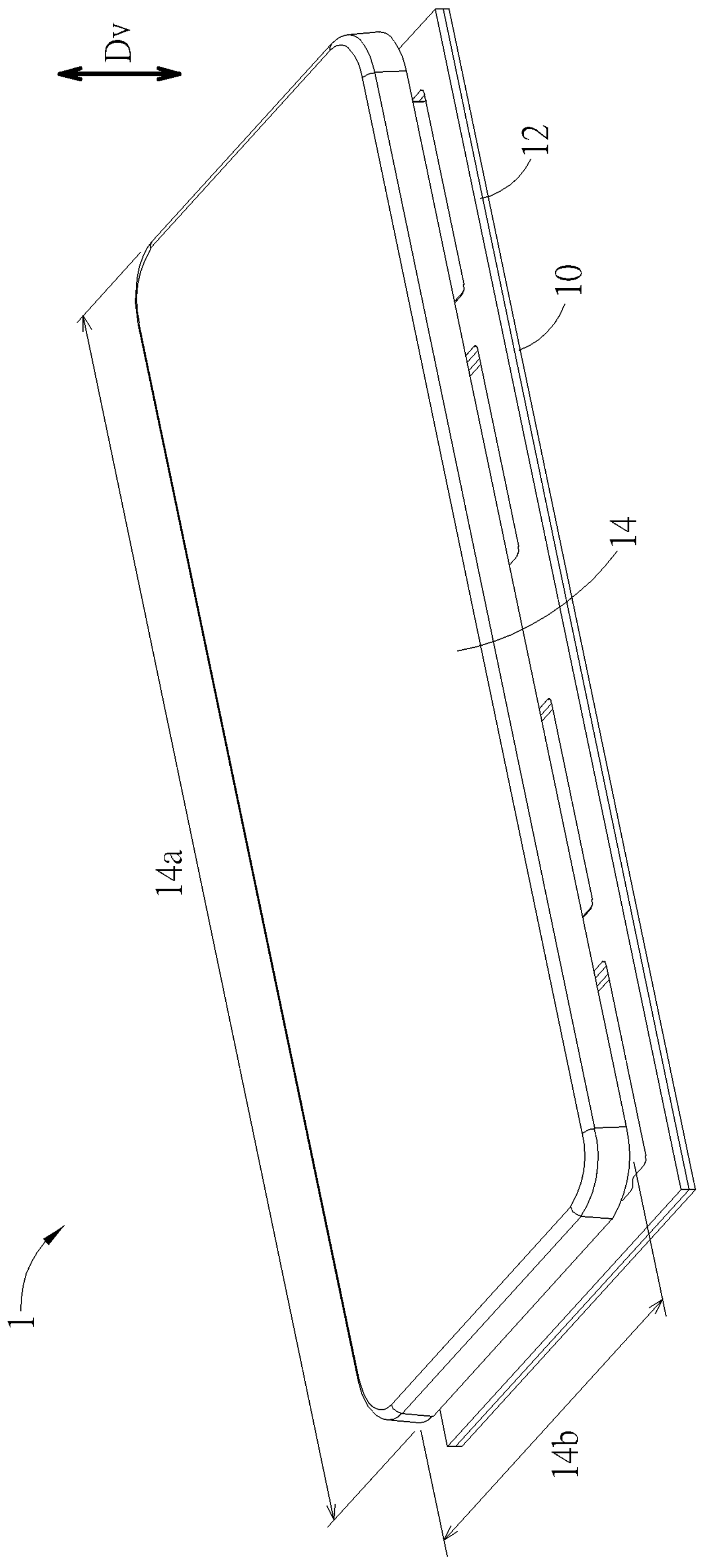
FIG. 1 is a schematic diagram illustrating a keyswitch structure according to a first embodiment.
Figure 2:
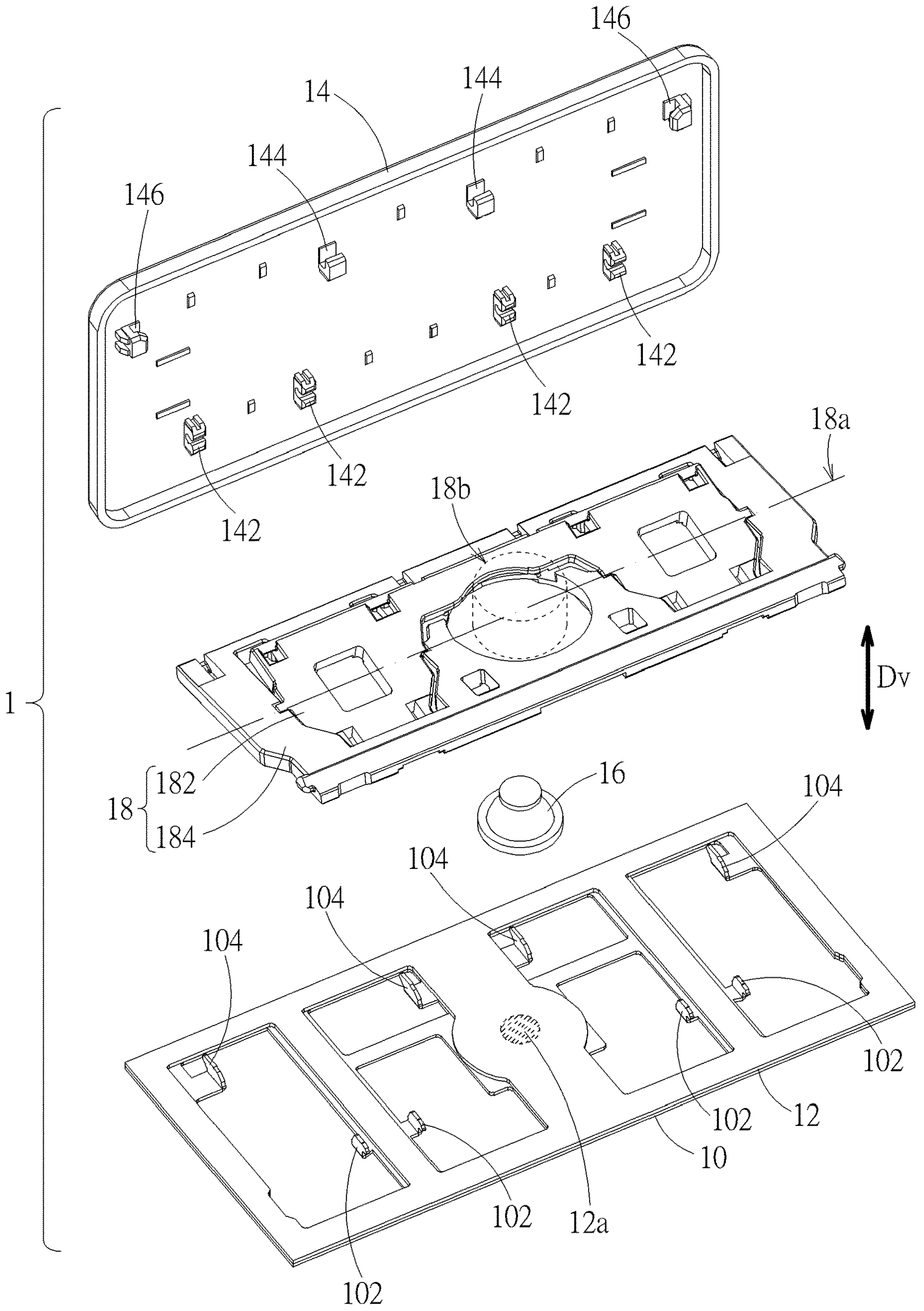
FIG. 2 is a partially-exploded view of the keyswitch structure in FIG. 1.

Please refer to FIG. 1 and FIG. 2. A keyswitch structure 1 according to a first embodiment includes a base plate 10, a switch circuit board 12, a keycap 14, a restoration part 16, and a keycap support mechanism 18. The switch circuit board 12 is stacked on the base plate 10. The switch circuit board 12 has a switch 12*a* (indicated by a circle with hatched lines in FIG. 2). The keycap 14 is disposed above the base plate 10. The keycap support mechanism 18 is connected to and between the base plate 10 and the keycap 14, so that the keycap 14 can move up and down relative to the base plate 10 through the keycap support mechanism 18 (i.e. moving along a vertical direction Dv (indicated by a double-headed arrow in the figures)). The restoration part 16 is disposed on the switch circuit board 12 corresponding to the switch 12. The keycap 14 can move down to squeeze the restoration part 16 to trigger the switch 12*a*. In this embodiment, the base plate 10 may be a stamped metal plate. The switch circuit board 12 may be a membrane circuit board (e.g., realized by a sandwich layer structure). The keycap 14 may be a plastic injection part. The restoration part 16 may be an elastic part, such as but not limited to a rubber dome. The keycap support mechanism 18 may be a plastic injection part. However, it is not limited thereto in practice.

Figure 3:
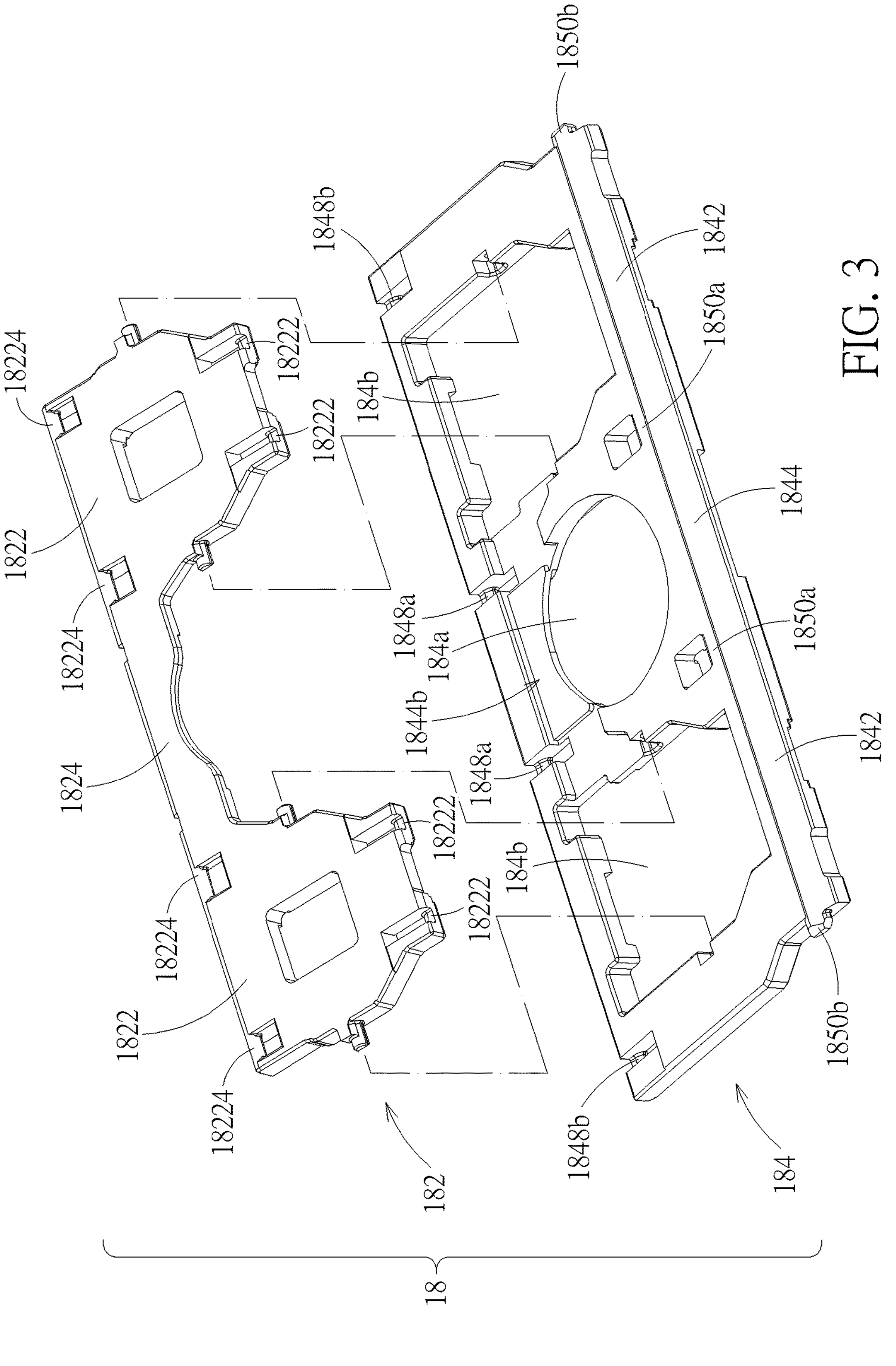
FIG. 3 is an exploded view of a keycap support mechanism of the keyswitch structure in FIG. 2.

Please refer to FIG. 2 and FIG. 3. The keycap support mechanism 18 includes an inner support 182 and an outer support 184. The inner support 182 and the outer support 184 are pivotally connected with each other around a rotation axis 18*a* (indicated by a chain line perpendicular to the vertical direction Dv in FIG. 2). The inner support 182 is respectively connected to the base plate 10 and the keycap 14 through opposite sides of the inner support 182 relative to the rotation axis 18*a*. The keycap support mechanism 18 as a whole defines a central space 18*b* (indicated by a cylinder in dashed lines in FIG. 2) passing through the whole keycap support mechanism 18. The central space 18*b* can provide space for the restoration part 16. The restoration part 16 will not interfere structurally with the keycap support mechanism 18 during elastic deformation of the restoration part 16.

For the inner support 182, please refer to FIG. 2 to FIG. 5. The inner support 182 includes two side frames 1822 and an inter-bridge 1824. The inter-bridge 1824 is connected to and between the two side frames 1822. The side frames 1822 and the inter-bridge 1824 are arranged along the rotation axis 18*a*. In terms of structural logic, the side frame 1822 is roughly a rectangular frame structure; the inter-bridge 1824 is roughly a long plate structure extending parallel to the rotation axis 18*a*, and its two ends are connected to the two side frames 1822, respectively. The side frame 1822 has two base plate connecting portions 18222 (or a pair of base plate connecting portions 18222) and two keycap connecting portions 18224 (or a pair of keycap connecting portion 18224). The base plate connecting portions 18222 are connected to connecting portions 102 of the base plate 10. The keycap connecting portions 18224 are connected to connecting portions 142 of the keycap 14. The inter-bridge 1824 is located on the keycap end of the inner support 182 (i.e. on the side of the keycap 14 that is connected to the inner support 182); on the other hand, the inter-bridge 1824 and the four keycap connecting portions 18224 are located at the same side of the rotation axis 18*a*. Furthermore, in a direction parallel to the rotation axis 18*a*, the inter-bridge 1824 is located between the two pairs of keycap connecting portions 18224. The inner support 182 as a whole is roughly an n-shaped structure; however, in structural logic, the two ends of the n-shaped structure are connected to the base plate 10, so that the inner support 182 and the base plate 10 (i.e., including the connecting portions 102 of the base plate 10 and the portion of the base plate 10 between the connecting portions 102 along the rotation axis 18*a*) can jointly form a rectangular frame structure. In other words, this structural configuration of the inner support 182 helps the inner support 182 to support the keycap 14 stably.

Furthermore, the two keycap connecting portions 18224 are not aligned with the two base plate connecting portions 18222 in a direction perpendicular to the rotation axis 18*a*. The distance 1822*a* between the two base plate connecting portions 18222 is less than the distance 1822*b* between the two keycap connecting portions 18224. This structural configuration is helpful for the stable connection between the inner support 182 and the keycap 14, and also for the stability of the inner support 182 supporting the keycap 14. Furthermore, a trapezoidal space 182*a* (indicated by a trapezoidal in chain lines in FIG. 5) is formed by and between the two side frames 1822 and the inter-bridge 1824. In other words, in structure, the side frame 1822 and the inter-bridge 1824 are not connected at 90 degrees, but are connected at an obtuse angle, which helps to reduce stress concentration at the connection between the side frame 1822 and the inter-bridge 1824. On the other hand, the side frame 1822 has an inner side arm 18228. The inner side arm 18228 and the inter-bridge 1824 form an included angle 182*b*; the included angle 182*b* is greater than 90 degrees, e.g., but not limited to 120 degrees. Furthermore, the central space 18*b* (as shown by FIG. 2) passes through the trapezoidal space 182*a*. The trapezoidal space 182*a* is formed between the two inner side arms 18228 of the two side frames 1822 and the inter-bridge 1824.

Figure 5:
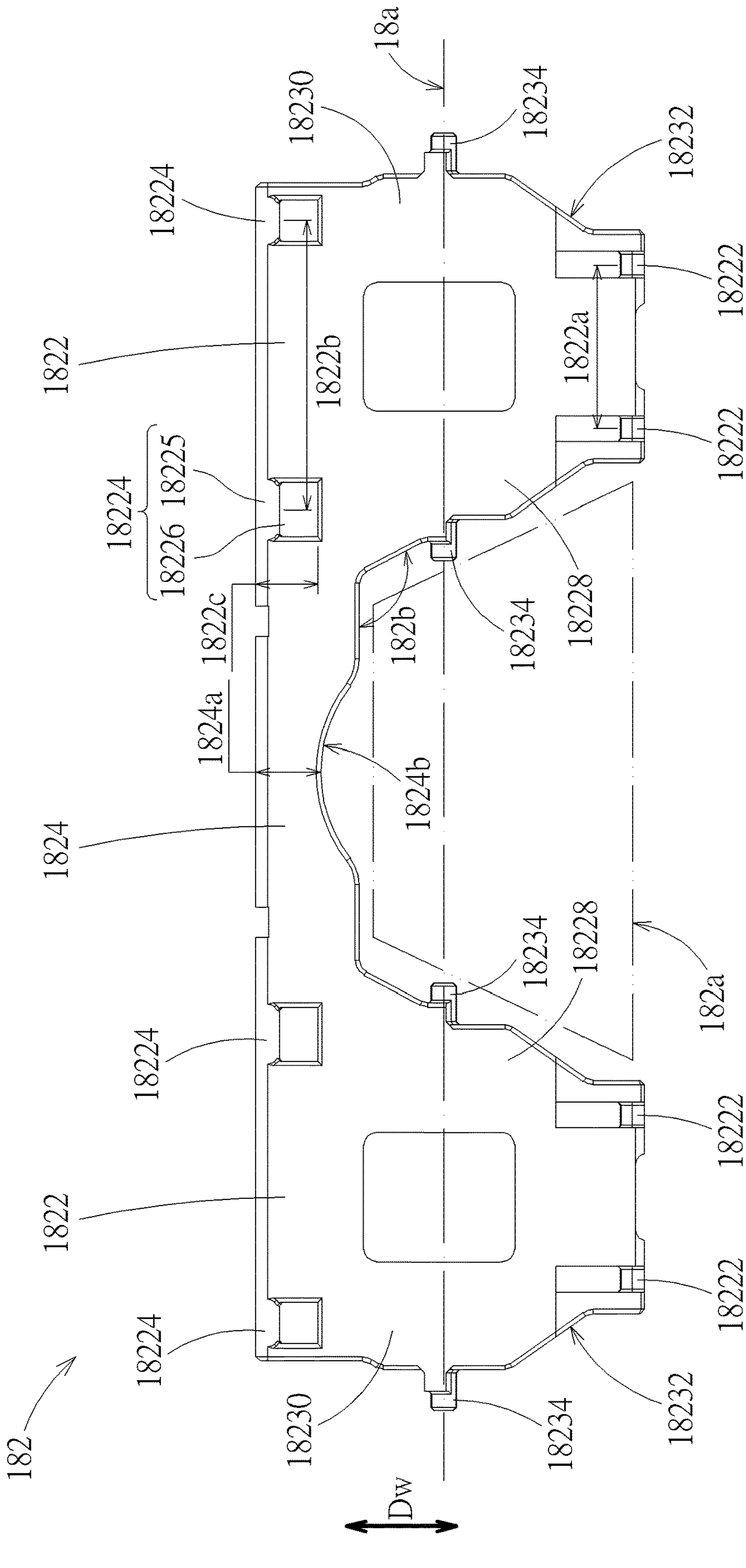
FIG. 5 is a top view of the inner support of the keycap support mechanism in FIG. 3.

Furthermore, as shown by FIG. 5, the four keycap connecting portions 18224 are located on the keycap end of the inner support 182. The keycap connecting portion 18224 includes a shaft portion 18225; a hook hole 18226 is formed beside the shaft portion 18225. The keycap connecting portion 18224 is pivotally connected with the connecting portion 142 of the keycap 14 (referring to FIG. 2) through the shaft portion 18225; therein, the shaft portion 18225 is rotatably clamped by the connecting portion 142, and the connecting portion 142 partially enters the hook hole 18226. The inter-bridge 1824 has a minimum width 1824*a* in a width direction Dw (indicated by a double-headed arrow in FIG. 5) perpendicular to the rotation axis 18*a*. In the embodiment, the inter-bridge 1824 has a concave edge 1824*b* to prevent the inter-bridge 1824 from entering the central space 18*b*. The minimum width 1824*a* of the inter-bridge 1824 occurs at a portion corresponding to the concave edge 1824*b* away from the rotation axis 18*a* (equivalent to the narrowest portion of the inter-bridge 1824). In practice, the inter-bridge 1824 may be a long plate structure with a uniform width; in this case, the minimum width is equivalent to the uniform width. The minimum width 1824*a* is greater than the distance 1822*c* from a hole edge of the hook hole 18226 away from the shaft portion 18225 to an outer edge of the keycap end of the inner support 182 (i.e., the outer side of the shaft portion 18225 in this embodiment) in the width direction Dw. This structural size design helps to reduce the impact of the hook hole 18226 (near the inter-bridge 1824) weakening the structural strength of the inner support 182. In practice, it is practicable to design such that the minimum width 1824*a* is greater than or equal to the aperture 1822*d* of the hook hole 18226 in the direction perpendicular to the rotation axis 18*a*. Furthermore, the two outer keycap connecting portions 18224 are located at corners of the inner support 182, which also helps the inner support 182 to be connected to the keycap 14 stably.

In addition, as shown by FIG. 5, the side frame 1822 has an outer side arm 18230. The outer side arm 18230 as a whole extends perpendicular to the rotation axis 18*a* and has a structure 18232 at an end portion thereof. The structure 18232 is indented towards the inside of the side frame 1822. The structure 18232 is located at a base plate end of the side frame 1822 (that is, at the side where the side frame 1822 is connected to the base plate 10). The indented structure 18232 can make room for the outer support 184, which is conducive to the structural design of the outer support 184.

Figure 6:
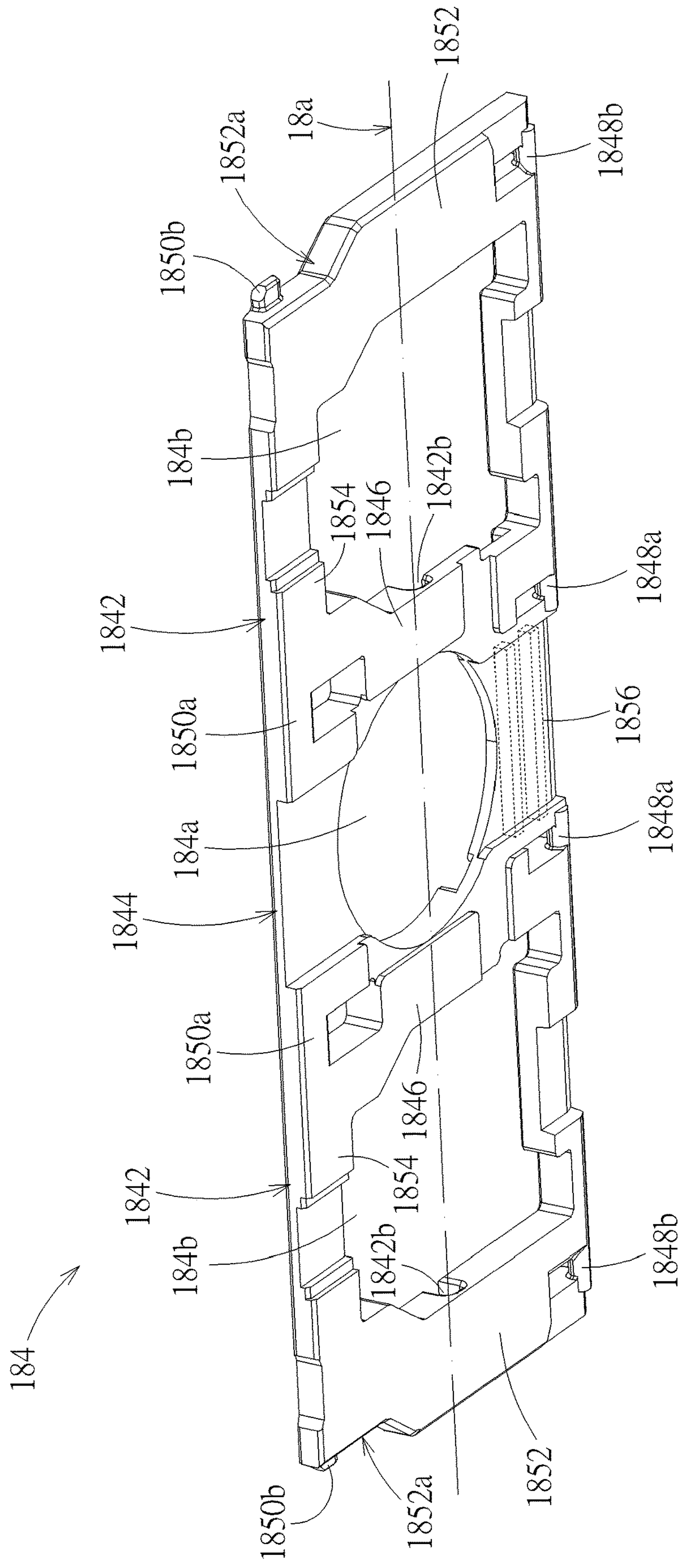
FIG. 6 is a schematic diagram illustrating an outer support of the keycap support mechanism in FIG. 3 from another viewpoint.
Figure 7:
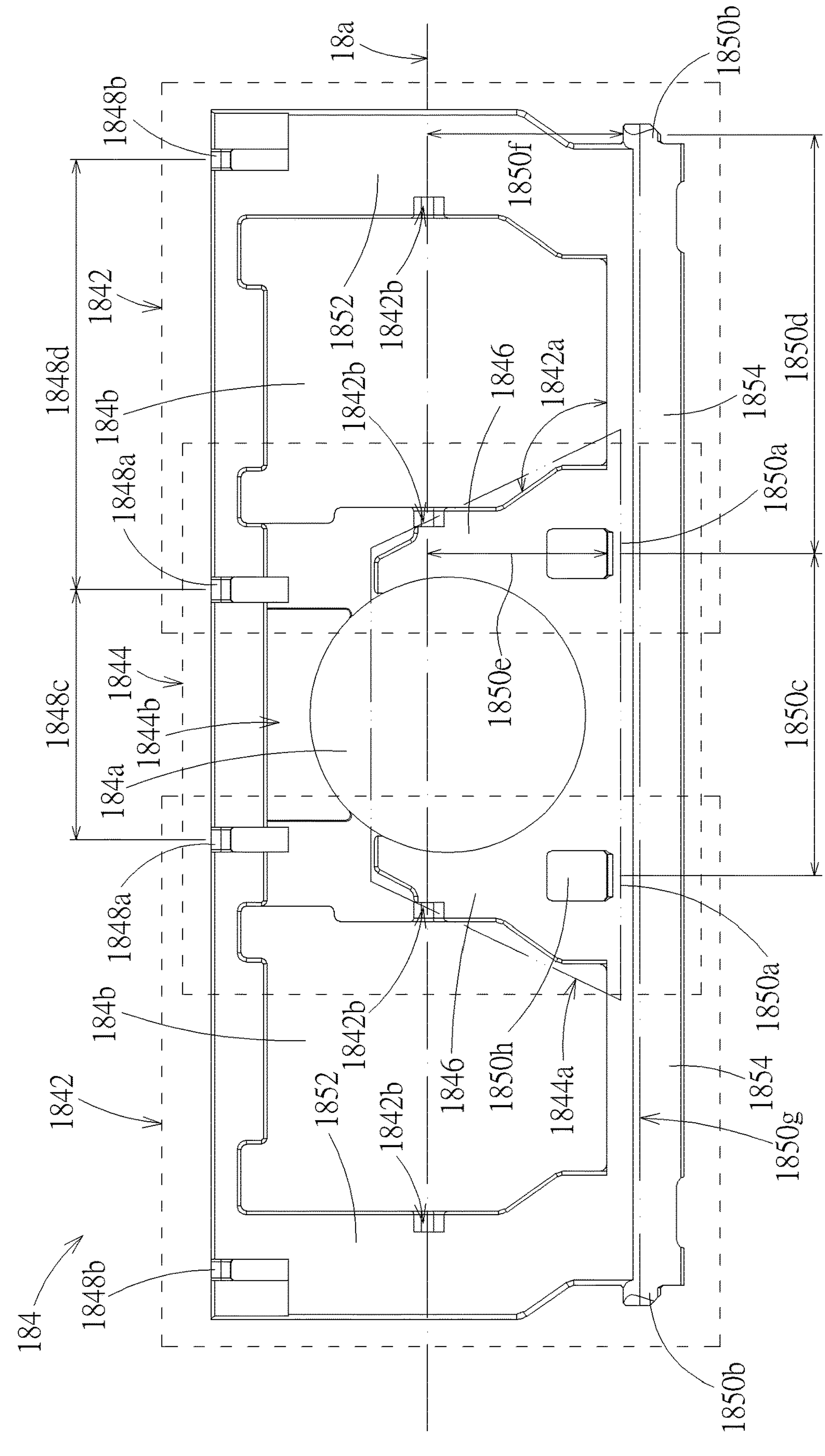
FIG. 7 is a top view of the outer support of the keycap support mechanism in FIG. 3.

For the outer support 184, Please refer to FIG. 2, FIG. 3, FIG. 6 and FIG. 7. The outer support 184 includes two outer frame portions 1842 and a central frame 1844. The central frame 1844 is located between the two outer frame portions 1842 along the rotation axis 18*a*. Taking outer support 184 as a whole, the outer support 184 is formed by an outer frame and two connecting arms connected to the inner side of the outer frame, so that the outer support 184 has three through holes 184*a* and 184*b* along the rotation axis 18*a*. In FIG. 7, the structural extents of the outer frame portions 1842 and the central frame 1844 are shown in dashed frames. As shown by FIG. 7, the central frame 1844 and the outer frame portions 1842 on the left and right sides of the central frame 1844 respectively share a side arm (i.e., inner side arms 1846 in the figures). The central frame 1844 has a through hole 184*a*. The central space 18*b* (as shown by FIG. 2) passes through the through hole 184*a*. The outer support 184 has four base plate connecting portions 1848*a* and 1848*b* and four keycap connecting portions 1850*a* and 1850*b*. The base plate connecting portions 1848*a* and 1848*b* are connected to connecting portions 102 of the base plate 10. The keycap connecting portions 1850*a* and 1850*b* are connected to connecting portions 142 of the keycap 14. Therein, the two base plate connecting portions 1848*a* and the two keycap connecting portions 1850*a* are located on the central frame 1844. The distance 1848*c* between the two base plate connecting portions 1848*a* is less than the distance 1850*c* between the two keycap connecting portions 1850*a*. Furthermore, the base plate connecting portions 1848*b* and the keycap connecting portions 1850*b* are located on the outer frame portions 1842. The base plate connecting portions 1848*a* and 1848*b* are not aligned with the keycap connecting portions 1850*a* and 1850*b* in the direction perpendicular to the rotation axis 18*a*.

Furthermore, as shown by FIG. 7, the setting positions of the base plate connecting portions 1848*a* and 1848*b* and the keycap connecting portions 1850*a* and 1850*b* may depend on the actual structure in practice. In the embodiment, compared with the base plate connecting portions 1848*a* and 1848*b*, the keycap connecting portions 1850*a* and 1850*b* are more evenly arranged parallel to the rotation axis 18*a*, which is conducive to the stability of the outer support 184 supporting the keycap 14. Moreover, the keycap connecting portions 1850*b* are located at corners of the outer support 184, which also helps the outer support 184 to be connected to the keycap 14 stably. Furthermore, the outer frame portion 1842 has an outer side arm 1852 opposite to the inner side arm 1846. The outer side arm 1852 as a whole extends perpendicular to the rotation axis 18*a* and has a structure 1852*a* at an end portion thereof. The structure 1852*a* is indented towards the inside of the outer frame portion 1842. The structure 1852*a* is located at a base plate end of the outer frame portion 1842 (that is, at the side where the outer frame portion 1842 is connected to the keycap 14). The keycap connecting portion 1850*b* is a shaft protruding from the structure 1852*a* parallel to the rotation axis 18*a*. The structure 1852*a* is designed so that the overall outline of the whole outer support 184 is rectangular and is similar to the outline of the keycap 14, which helps the keycap support mechanism 18 to support the keycap 14 stably. Therein, for the right outer frame portion 1842, the distance 1848*d* between the two base plate connecting portions 1848*a* and 1848*b* is greater than the distance 1850*d* between the two keycap connecting portions 1850*a* and 1850*b*. Furthermore, for the keycap connecting portions 1850*a* and 1850*b*, the distance 1850*c* between the keycap connecting portions 1850*a* on the central frame 1844 is less than the distance 1850*d* between the keycap connecting portions 1850*a* and 1850*b* on the outer frame portion 1842. In addition, in the embodiment, the structures 1852*a* of the outer frame portion 1842 are disposed corresponding to the structures 18232 of the side frames 1822 (of the inner support 182), so that the structures 18232 (of the inner support 182) make rooms for the outer side arms 1852 of the outer support 184 to extend into to enhance the structural strength of the outer support 184. Moreover, the outer frame portion 1842 has a lateral arm 1854 connected to the inner side arm 1846. The lateral arm 1854 extends parallel to the rotation axis 18*a*. The inner side arm 1846 and the lateral arm 1854 form an included angle 1842*a*. The included angle is greater than 90 degrees, e.g., but not limited to 120 degrees. This structural configuration helps to reduce stress concentration at the connection between the lateral arm 1854 and the inner side arm 1846.

Furthermore, as shown by FIG. 7, the distance 1850*e* from the keycap connecting portion 1850*a* (on the central frame 1844) to the rotation axis 18*a* is less than the distance 1850*f* from the keycap connecting portion 1850*b* (on the outer frame portion 1842) to the rotation axis 18*a*. The keycap connecting portions 1850*a* and 1850*b* are rotatably and slidably connected to the connecting portions 144 and 146 of the keycap 14 (referring to FIG. 2); therein, the connecting portions 144 and 146 are in the form of sliding slot, in which the keycap connecting portions 1850*a* and 1850*b* rotate and slide. The keycap connecting portion 1850*a* is closer to the rotation axis 18*a* than the keycap connecting portion 1850*b*, or the distance between the hole edge of the keycap connecting portion 1850*a* and the outer edge of the keycap end of the central frame 1844 is larger. This can increase the structural strength of the outer support 184 (or the central frame 1844) near the keycap connecting portion 1850*a*, which is conducive to the stability of the outer support 184 (or the keycap end thereof) supporting the keycap 14. Furthermore, on the other hand, in the embodiment, the keycap end of the outer support 184 has a middle line 1850*g* (indicated by a chain line in FIG. 7) parallel to the rotation axis 18*a*; in practice, the keycap connecting portion 1850*b* may be a protruding shaft extending parallel to the rotation axis 18*a*, and the central axis of this protruding shaft can be defined as the middle line 1850*g*. The middle line 1850*g* does not pass through any hole structure (including the through holes 184*a* and 184*b*, the hook holes 1850*h* (in which the connecting portions 144 of the keycap 14 partially enter) beside the keycap connecting portions 1850*a*, and so on) on the outer support 184. Thereby, the keycap end of the outer support 184 can have a continuous physical structure parallel to the rotation axis 18*a*, which also is conducive to the stability of the outer support 184 (or the keycap end thereof) supporting the keycap 14. In practice, the width of this physical structure may be designed to be greater than half of the width of the hook hole 1850*h* (in the direction perpendicular to the rotation shaft 18*a*).

Please refer to FIG. 2, FIG. 3, FIG. 5 and FIG. 7. The inner support 182 is located inside the outer support 184. The two side frames 182 of the inner support 182 correspond to the two outer frame portions 1842 of the outer support 184. The two side frames 182 of the inner support 182 are pivotally connected (around the rotation axis 18*a*) with the inner sides of the two outer frame portions 1842 respectively (i.e., the side frames 182 are located in the through holes 184*b* formed by the corresponding outer frame portions 1842). Therein, the side frame 182 has a protruding shaft 18234 on both sides thereof along the rotation axis 18*a*; the outer frame portion 1842 correspondingly has a shaft hole 1842*b* on both sides thereof along the rotation axis 18*a*. The protruding shafts 18234 are rotatably inserted into the shaft holes 1842*b*. Furthermore, in the direction parallel to the rotation axis 18*a*, on the outer side arm 18230 of the side frame 1822 of the inner support 182, the keycap connecting portion 18224 is closer to the protruding shaft 18234 than the base plate connecting portion 18222; on the outer side arm 1852 of the outer frame portion 1842 of the outer support 184, the keycap connecting portion 1850*b* is further away from the shaft hole 1842*b* than the base plate connecting portion 1848*b*.

Figure 8:
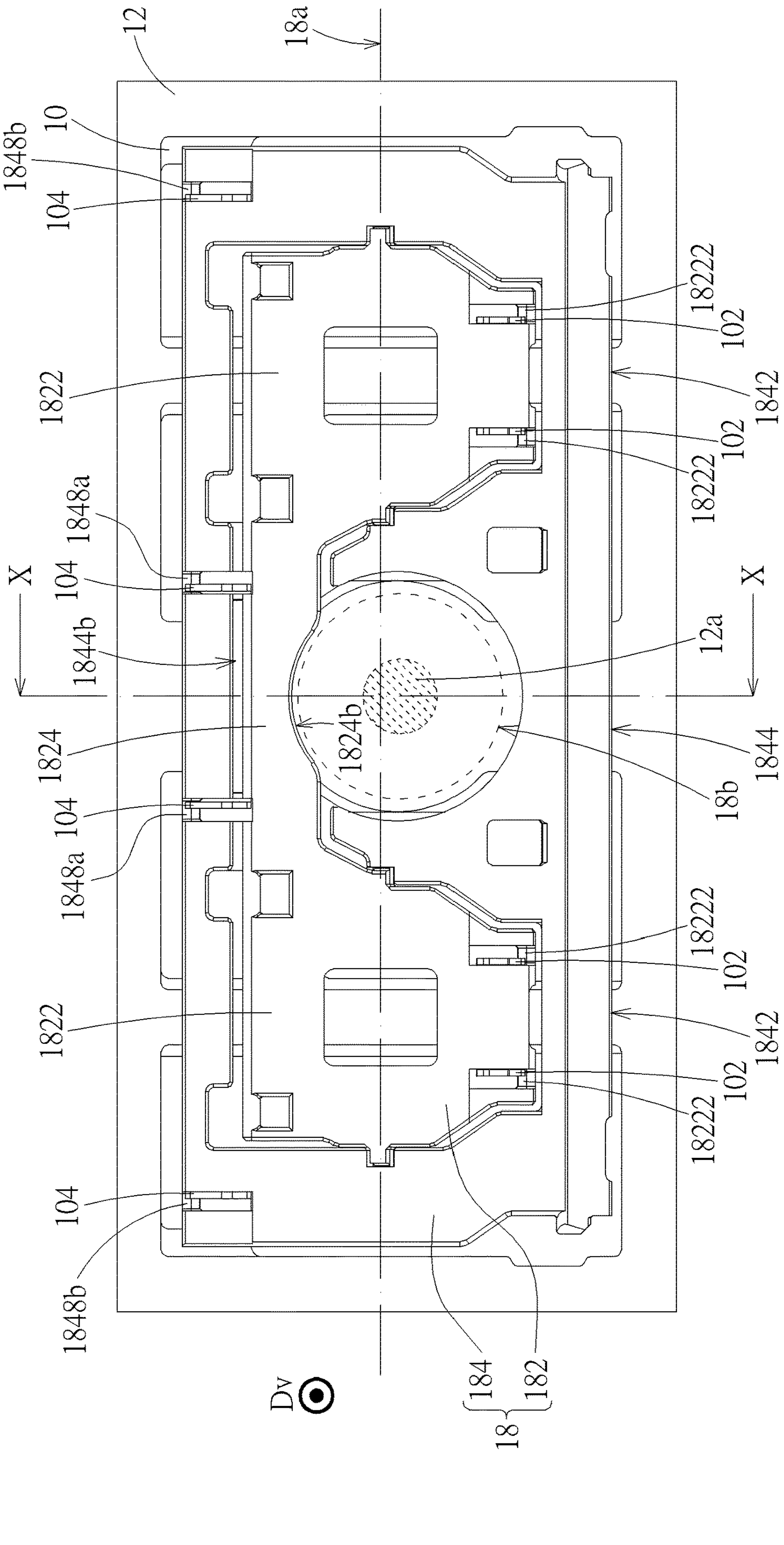
FIG. 8 is a top view of the keycap support mechanism in FIG. 2 when the keycap support mechanism is folded.
Figure 9:
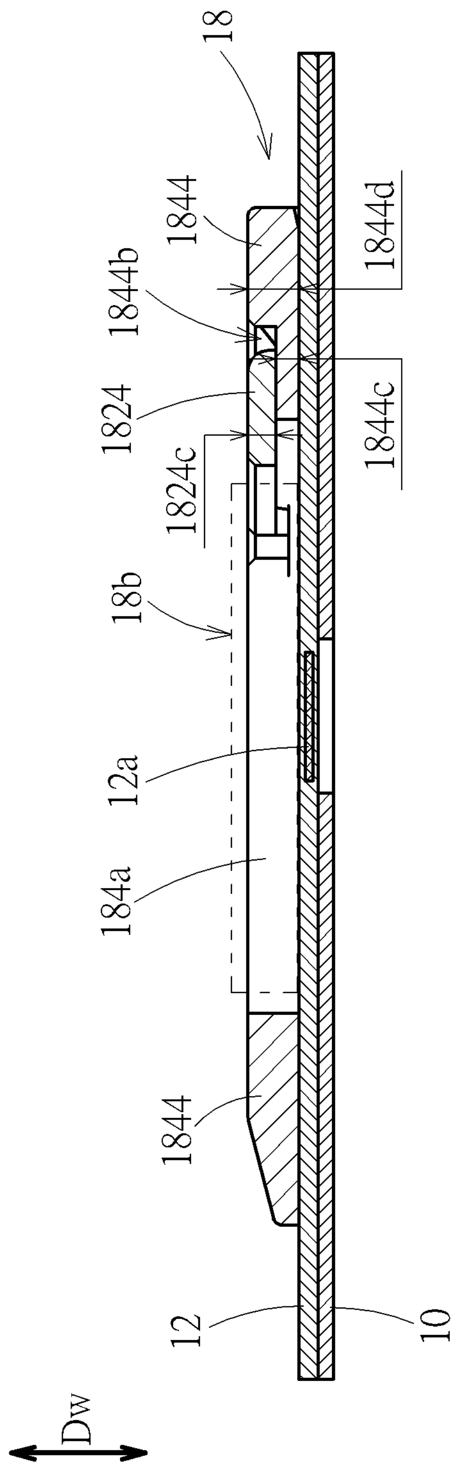
FIG. 9 is a sectional view of the keycap support mechanism along the line X-X in FIG. 8.

Please also refer to FIG. 8, which is a top view of the inner support 182 and the outer support 184 when they are folded (i.e., the inner support 182 and the outer support 184 are horizontally stacked together). When the inner support 182 is stacked on the outer support 184, the inner support 182 is completely inside the outer support 184 and straddles the central frame 1824, and the inter-bridge 1824 is stacked on the central frame 1824 and is located between the central space 18*b* (in FIG. 8, indicated by a dashed circle) and the base plate end of the central frame 1824. Furthermore, in the viewpoint of FIG. 8, the central frame 1824 can define a structure 1844*a* (in FIG. 7, its structural extent can be indicated by a trapezoidal frame in chain lines) on its lower half portion corresponding to the trapezoidal space 182*a* of the inner support 182. The central frame 1824 has a slot 1844*b* on its upper half portion. The slot 1844*b* is beside the structure 1844*a* and under the inter-bridge 1824 of the inner support 182. When the inner support 182 is stacked on the outer support 184, the inter-bridge 1824 enters the slot 1844*b*, and the structure 1844*a* of the central frame 1824 enters the trapezoidal space 182*a*. Thereby, by the arrangement of the trapezoidal space 182*a* of the inner support 182, the through holes 184*b* and the slot 1844*b* of the outer support 184, and so on, the structural interference between the inner support 182 and the outer support 184 can be reduced. In the embodiment, the overall thickness of the outer support 184, the overall thickness of the inner support 182, and the overall thickness of the keycap support mechanism 18 after folded (i.e., the inner support 182 is stacked on the outer support 184) are roughly equivalent. This structural configuration is conducive to a low profile design of the keyswitch structure 1. For example, as shown by FIG. 9, the sum of the thickness 1844*c* of the slot 1844*b* (or the thickness of the bottom of the slot 1844*b*) and the thickness 1824*c* of the inter-bridge 1824 is equal to the thickness 1844*d* of the base plate end of the central frame 1844.

Furthermore, please refer to FIG. 6. In practice, the outer support 184 has at least one protrusion 1856 (shown in dashed lines in the figure) protruding downward, corresponding to the inter-bridge 1824 (of the inner support 182), for reinforcing the structural strength of the outer support 184 here. The protrusion 1856 may be elongated and extend parallel to the rotation axis 18*a*. In practice, the protrusion 1856 is not limited to be provided corresponding to the inter-bridge 1824.

Please refer to FIG. 1 and FIG. 2. The keyswitch structure 1 can be applied to long keys in practice, such as space key, Enter key, Shift key, CapsLock key, Ctrl key and so on. The keycap 14 extends longitudinally parallel to the rotation axis 18*a*. The keycap 14 has a length 14*a* (i.e., the dimension along the rotation axis 18*a*) and a width 14*b* (i.e., the dimension in the direction perpendicular to the rotation axis 18*a* and the vertical direction Dv). The ratio of the length 14*a* to the width 14*b* is, for example, between 1.7 and 3.0.

As discussed above, the keyswitch structure 1 as a whole is a long key. The keycap support mechanism 18 as a whole extends longitudinally parallel to the rotation axis 18*a*. Therein, the inner support 182 and the outer support 184 both extend continuously in structure along the rotation axis 18*a*. Each of the inner support 182 and the outer support 184 has four side arms (18228, 18230, 1846, and 1852). The pivot connection between the inner support 182 and the outer support 184 can be logically regarded as a combination of multiple scissors supports; therein, the outer support 184 provides three annular supports (including two outer frame portions 1842 and one central frame 1844), and the inner support 182 provides two annular supports (including two side frames 1822 connected by one inter-bridge 1824). The two side frames 1822 are pivotally connected with the two outer frame portions 1842, respectively, to form two scissors supports. Moreover, the two side frames 1822 are pivotally connected to the central frame 1844 together to form one scissors support. Thereby, the keycap support mechanism 18 can transfer force smoothly along the rotation axis 18*a*, so that the keycap 14 can move up and down steadily through the keycap support mechanism 18, and no additional balance bar is needed for auxiliary support (e.g., in the long keys of a traditional keyboard, a third support independent of the scissors support is connected to the keycap and the base plate). Furthermore, the outer support 184 as a whole is a rectangular frame structure, and the structure is stable, which is conducive to transferring force parallel to the rotation axis 18*a*. The inner support 182 utilizes the included angle 182*b* greater than 90 degrees to reduce the stress concentration, which is also conducive to transferring force parallel to the rotation axis 18*a*. The outer support 184 also has a similar structural connection design (e.g., the included angle 1842*a* at the through hole 184*b*).

Figure 4:
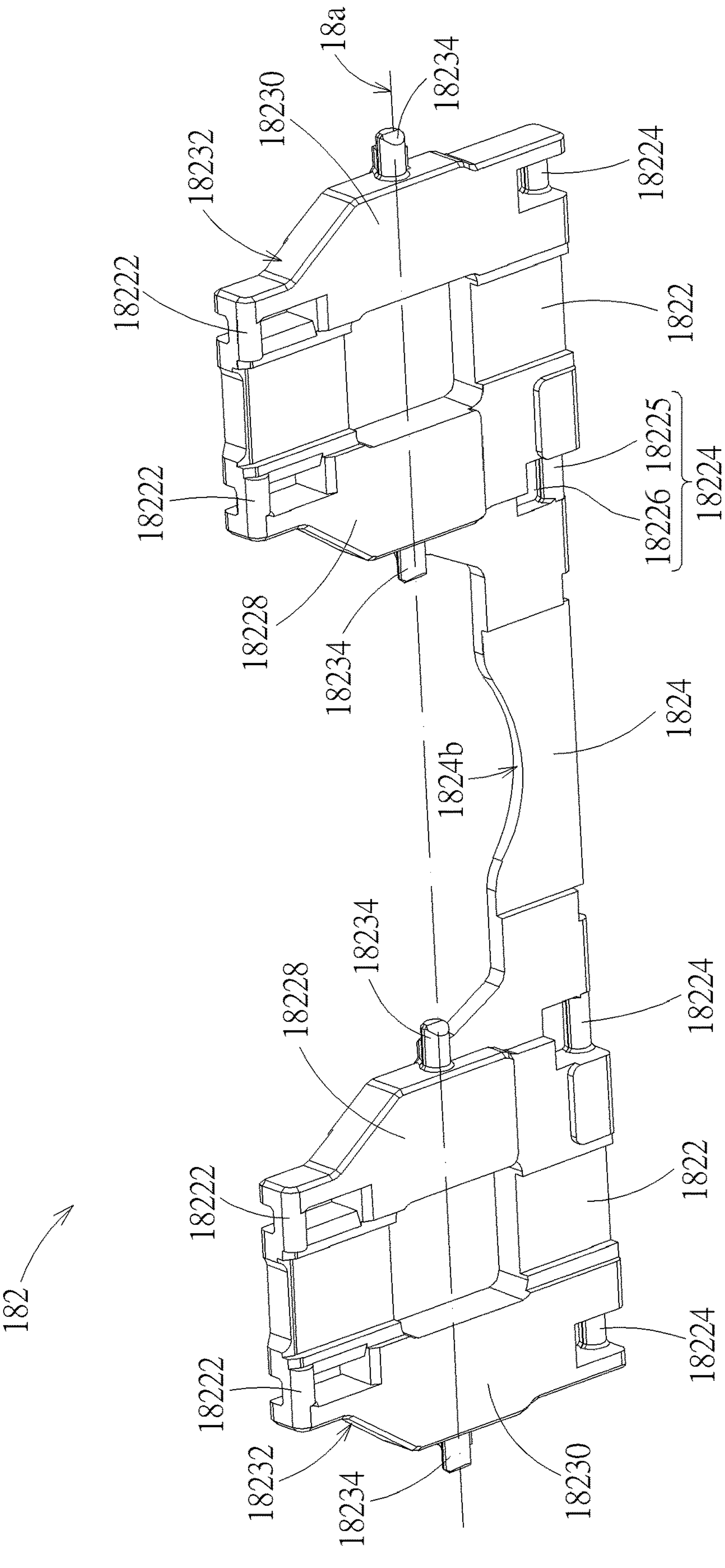
FIG. 4 is a schematic diagram illustrating an inner support of the keycap support mechanism in FIG. 3 from another viewpoint.

In addition, in the embodiment, as shown by FIG. 2, FIG. 4 and FIG. 5, the surfaces of the inner support 182 and the outer support 184 toward the base plate 10 are not flat. This structural design is not only for the structural matching between the inner support 182 and the outer support 184 (for example, when the inner support 182 is stacked on the outer support 184, the inter-bridge 1824 of the inner support 182 will enter the slot 1844*b* on the central frame 1844 of the outer support 184), but also for allowing the inner support 182 and the outer support 184 to partially enter openings of the base plate 10 and the switch circuit board 12 when the inner support 182 is stacked on the outer support 184. It can increase the structural volumes of the inner support 182 and the outer support 184 without affecting the overall height of the keyswitch structure 1, which helps to enhance the structural strength of the inner support 182 and the outer support 184 and the stability of the inner support 182 and the outer support 184 supporting the keycap 14. In the embodiment, when the inner support 182 is stacked on the outer support 184, the bottom surfaces of the inner support 182, the outer support 184, and the base plate 10 are coplanar, which is conducive to providing the inner support 182 and the outer support 184 with larger structural volumes.

Figure 10:
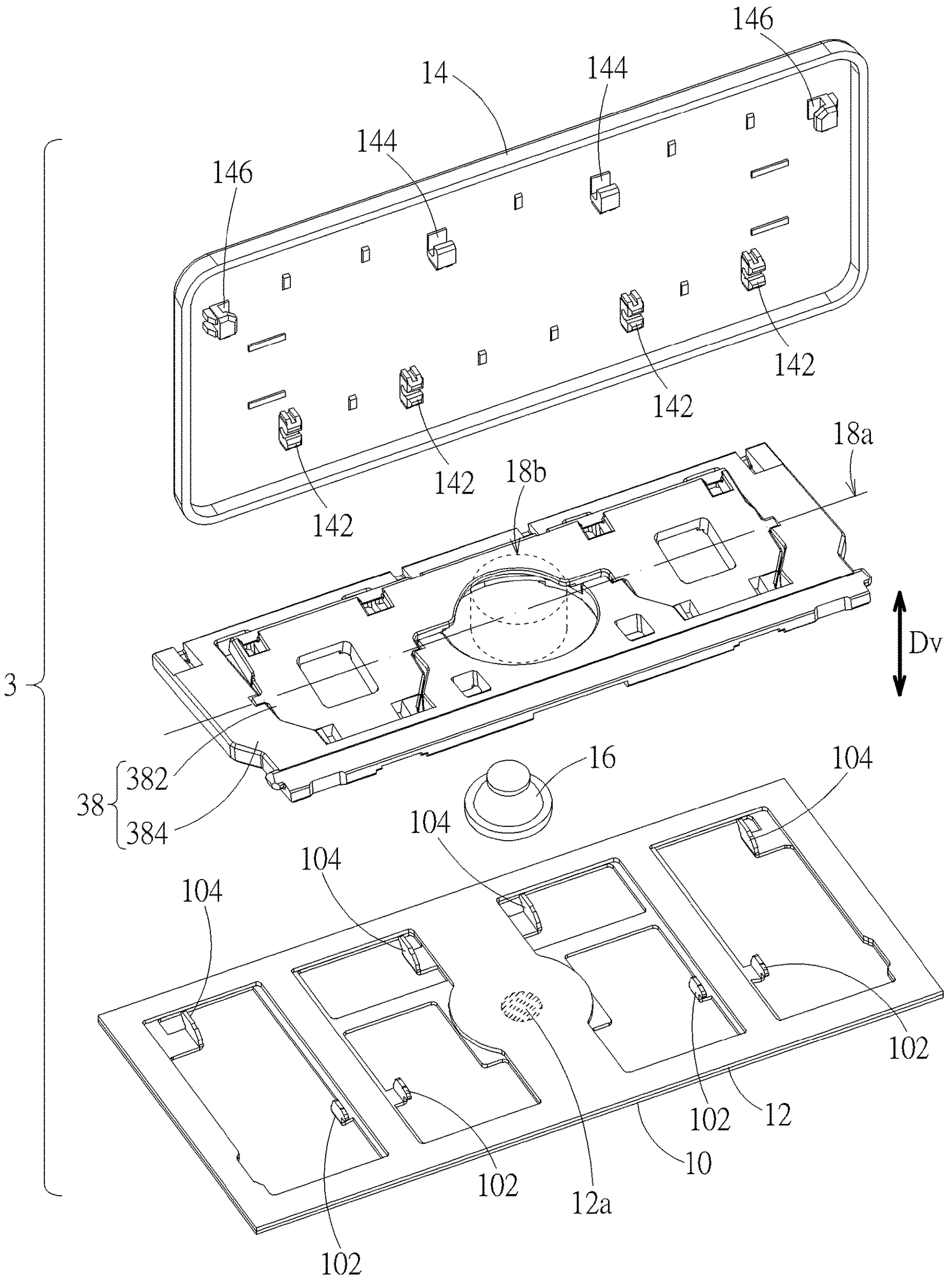
FIG. 10 is a partially-exploded view of a keyswitch structure according to a second embodiment.
Figure 11:
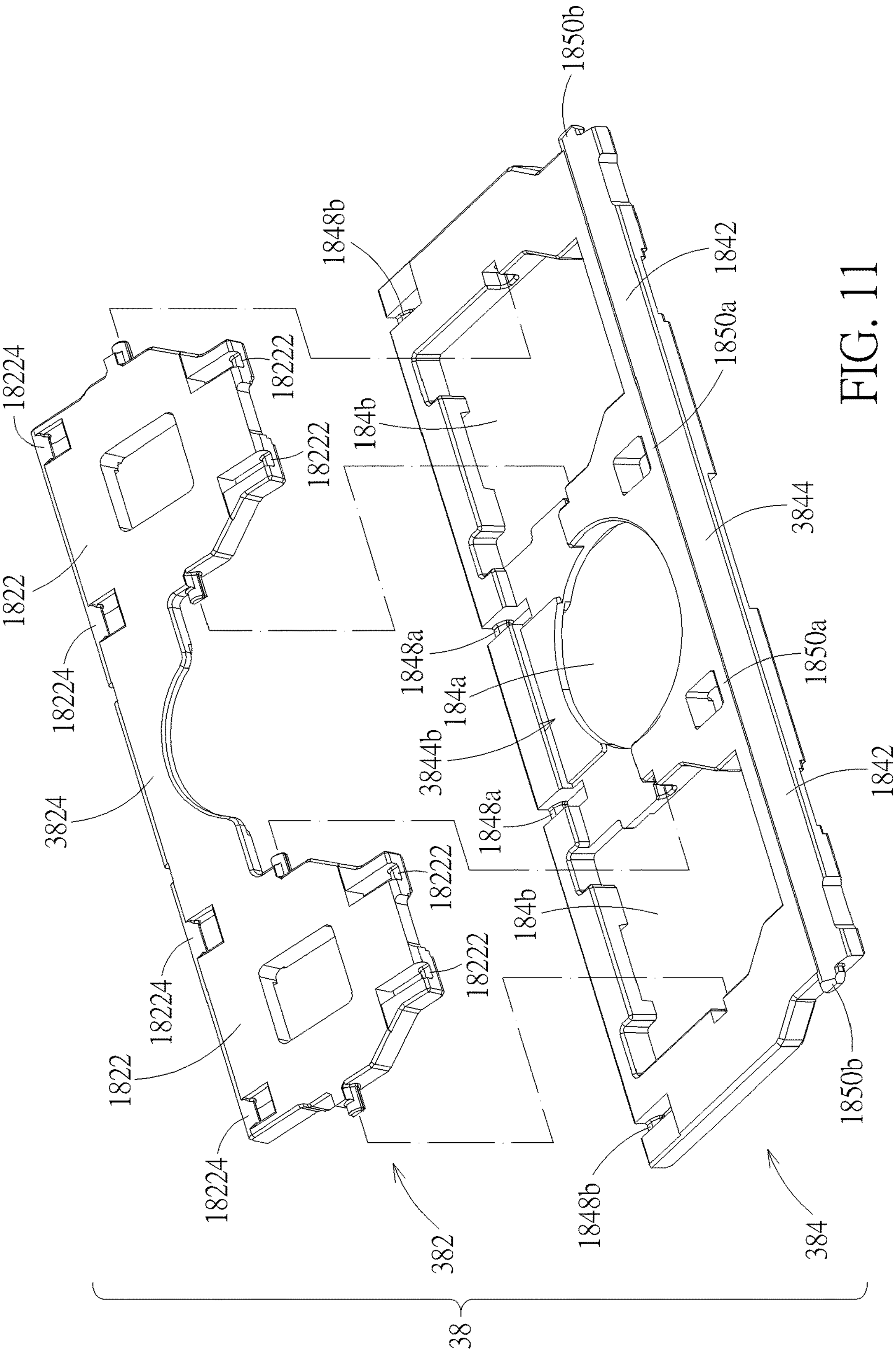
FIG. 11 is an exploded view of a keycap support mechanism of the keyswitch structure in FIG. 10.

Please refer to FIG. 10 and FIG. 11, which show a keyswitch structure 3 according to a second embodiment. The keyswitch structure 3 is similar in structure to the keyswitch structure 1. The keyswitch structure 3 uses the reference symbols of the components of the keyswitch structure 1 in principle. For other descriptions of the keyswitch structure 3, please directly refer to the relevant descriptions of the keyswitch structure 1, which will not be repeated in addition. A main difference between the keyswitch structure 3 and the keyswitch structure 1 is that the inter-bridge 3824 of the inner support 382 of the keycap support mechanism 38 of the keyswitch structure 3 is wider than the inter-bridge 1824 of the inner support 182 of the keycap support mechanism 18; correspondingly, the slot 3844*b* on the central frame 3844 of the outer support 384 of the keycap support mechanism 38 is wider than the slot 1844*b* on the central frame 1844 of the outer support 184 of the keycap support mechanism 18. Thereby, the structural strength of the inner support 382 of the keycap support mechanism 38 is relatively enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keycap support mechanism, comprising:

an inner support; and an outer support, the outer support and the inner support being pivotally connected with each other around a rotation axis, the outer support comprising two outer frame portions and a central frame, the central frame being located between the two outer frame portions along the rotation axis, wherein when the inner support is stacked on the outer support, the inner support is located inside the outer support and straddles the central frame.

2. The keycap support mechanism according to claim 1, wherein the inner support comprises two side frames and an inter-bridge, the inter-bridge connects the two side frames, the two side frames and the inter-bridge are arranged parallel to the rotation axis, and when the inner support is stacked on the outer support, the inter-bridge is stacked on the central frame.

3. The keycap support mechanism according to claim 2, wherein the central frame has a through hole, the keycap support mechanism as a whole defines a central space passing through the whole keycap support mechanism, the central space passes through the through hole, and when the inner support is stacked on the outer support, the inter-bridge is located between the central space and a base plate end of the central frame.

4. The keycap support mechanism according to claim 2, wherein the inter-bridge is located on a keycap end of the inner support.

5. The keycap support mechanism according to claim 4, wherein the inner support has a keycap connecting portion, the keycap connecting portion is located on the keycap end of the inner support and comprises a shaft portion, a hook hole is formed beside the shaft portion, the inter-bridge has a minimum width in a width direction perpendicular to the rotation axis, wherein the minimum width is greater than or equal to a distance from a hole edge of the hook hole away from the shaft portion to an outer edge of the keycap end of the inner support in the width direction, or the minimum width is greater than or equal to a hole size of the hook hole in a direction perpendicular to the rotation axis.

6. The keycap support mechanism according to claim 2, wherein each of the two side frames has an inner side arm that is connected to the inter-bridge, the inner side arm and the inter-bridge form an included angle, and the included angle is greater than 90 degrees.

7. The keycap support mechanism according to claim 2, wherein each of the two side frames has two base plate connecting portions and two keycap connecting portions, a distance between the two base plate connecting portions is less than a distance between the two keycap connecting portions, a trapezoidal space is formed by and between the two side frames and the inter-bridge, and when the inner support is stacked on the outer support, the central frame enters the trapezoidal space.

8. The keycap support mechanism according to claim 2, wherein the central frame has a slot under the inter-bridge, and when the inner support is stacked on the outer support, the inter-bridge enters the slot.

9. The keycap support mechanism according to claim 8, wherein a sum of a thickness of the slot and a thickness of the inter-bridge is equal to a thickness of a base plate end of the central frame.

10. The keycap support mechanism according to claim 2, wherein the two side frames correspond to the two outer frame portions, and the two side frames are pivotally connected to a corresponding outer frame portion through opposite sides of the two side frames.

11. The keycap support mechanism according to claim 2, wherein the central frame has at least one protrusion protruding downward, corresponding to the inter-bridge.

12. The keycap support mechanism according to claim 1, wherein the outer support has two base plate connecting portions and two keycap connecting portions on the central frame, and a distance between the two base plate connecting portions is less than a distance between the two keycap connecting portions.

13. The keycap support mechanism according to claim 1, wherein the central frame shares a side arm with the two outer frame portions respectively.

14. The keycap support mechanism according to claim 1, wherein each outer frame portion has an inner side arm and a lateral arm connected to the inner side arm, the lateral arm extends parallel to the rotation axis, the inner side arm and the lateral arm form an included angle, and the included angle is greater than 90 degrees.

15. The keycap support mechanism according to claim 1, wherein each outer frame portion has an outer side arm, the outer side arm has a structure that is indented towards an inside of each outer frame portion, and the structure is located on a keycap end of each outer frame portion.

16. The keycap support mechanism according to claim 1, wherein the outer frame portions have two base plate connecting portions and two keycap connecting portions, and a distance between the two base plate connecting portions is greater than a distance between the two keycap connecting portions.

17. The keycap support mechanism according to claim 1, wherein the outer support has two keycap connecting portions on the outer frame portions and the central frame respectively, and a distance from the keycap connecting portion that is located on the central frame to the rotation axis is less than a distance from the keycap connecting portion that is located on the outer frame portion to the rotation axis.

18. The keycap support mechanism according to claim 1, wherein the outer support has two keycap connecting portions on the central frame, and a keycap connecting portion on the outer frame portions, and a distance between the two keycap connecting portions on the central frame is less than a distance from the keycap connecting portion on the outer frame portion to the relatively close keycap connecting portion on the central frame.

19. A keyswitch structure, comprising:

a base plate;

a keycap, disposed above the base plate; and a keycap support mechanism, comprising:

an inner support, connected to and between the base plate and the keycap; and an outer support, connected to and between the base plate and the keycap, the outer support and the inner support being pivotally connected with each other around a rotation axis, the outer support comprising two outer frame portions and a central frame, the central frame being located between the two outer frame portions along the rotation axis, the keycap moving up and down relative to the base plate through the outer support and the inner support, wherein when the inner support is stacked on the outer support, the inner support is located inside the outer support and straddles the central frame.

20. The keyswitch structure according to claim 19, wherein the keycap extends longitudinally parallel to the rotation axis, the keycap has a length and a width, and a ratio of the length to the width is between 1.7 and 3.0.

* * * * *